Nov. 24, 1970 H. SCHADE 3,543,238

RASTER SCANNING APPARATUS WHICH PROVIDES AN OUTPUT CORRESPONDING TO A SCAN ALONG ONLY A FEW PREDETERMINED LINES

Filed June 14, 1967 3 Sheets-Sheet 1

INVENTOR

H. SCHADE

BY Theodore E. Galanthay

AGENT

United States Patent Office 3,543,238

Patented Nov. 24, 1970

3,543,238

RASTER SCANNING APPARATUS WHICH PROVIDES AN OUTPUT CORRESPONDING TO A SCAN ALONG ONLY A FEW PREDETERMINED LINES

Helmut Schade, Boblingen, Germany, assignor to International Business Machines Corporation, Armonk, N.Y., a corporation of New York Filed June 14, 1967, Ser. No. 646,075
Claims priority, application Germany, June 15, 1966, J 31,073
Int. Cl. G06k 9/10
U.S. Cl. 340—146.3 4 Claims

ABSTRACT OF THE DISCLOSURE

An automatic character recognition apparatus having means for pre-scanning a character prior to the main scan, and circuitry for deriving a simplified scan pattern for the main scan from the information provided by the pre-scan; the main scan for identifying a character being performed simultaneously with the pre-scan of the next character.

This invention relates to a character recognition apparatus. More specifically, this invention relates to a character recognition apparatus wherein the scanning pattern of the main scan, for identifying a character, is determined by information obtained from pre-scanning said character.

Briefly, automatic character recognition systems are well known in the art as devices for recognizing information in printed or written form and for converting such information into a machine utilizable form. Accordingly, automatic character recognition devices generally have the function of being a connecting link between written or printed information and corresponding input information to a data processing system. More specifically, automatic character recognition systems generally include an optical system for converting the visual data into some form of electrical signals, and further include circuitry for converting these electrical signals into some form of recognizable code. These coded electrical signals are then compared to previously stored reference signals until a positive comparison indicates the identity of the character.

One well known method of automatic character recognition relates to the scanning of the character to be recognized, by means of a light source and photocell arrangement, the photocell providing an electrical output which is an indication of the black and white portions of the scanned area. The electrical impulses derived from the photocell can then be compared to previously stored electrical signals; the successive comparison of the unknown signals with each of the known sets of signals, eventually providing a comparison which will define the character. Many problems are encountered in the scanning of a character, because of frequently unavoidable variations in the size, thickness, and orientation of the various characters to be recognized. The problems are greatly increased in the recognition of hand written characters which tend to vary more than machine printed characters. The greater the variation in the characters, the more difficult it becomes to store reference characters for accurate comparison with the unknown characters.

To overcome this inherent problem in the scanning of unknown characters, many different scanning techniques have been developed. One such technique relates to the scanning of the characters along closely spaced parallel lines, and recording the transitions from the black and white portions of the area scanned; the number and location of the transitions being an indication of the identity of the character. This technique is relatively insensitive to variations in the position of the characters. A disadvantage is that it is very sensitive to small variations in the size and shape of the character which will lead to variations in the output signal from the photocell, thereby making comparison with previously stored reference characters difficult.

Another well-known method relates to scanning along only a few predetermined scanning lines. The identity of the character can be determined according to which of the predetermined scanning lines is intersected by the unknown character. This technique has an advantage over the previously mentioned technique in that it is relatively unaffected by small variations in the shape of the character. This technique, however, has the disadvantage of being very sensitive to the geometric position of a character. A further disadvantage is that the predetermined scanning pattern is more complicated to generate and at the desired scanning speeds requires a cathode ray tube.

The present invention overcomes the disadvantages of the prior art techniques by combining the advantages of these techniques and eliminating the disadvantages. More specifically, this invention has the advantage of being relatively insensitive to variations in geometrical position which is a feature of the former technique, combined with the advantages of being relatively insensitive to shape and line thickness, which is a feature of the latter technique, namely scanning along a few predetermined lines. These advantages are achieved by pre-scanning a character prior to the main (identifying) scan. The pre-scan is accomplished by a plurality of closely spaced parallel scanning lines. The information gained from the pre-scan is not used for identifying the character, but rather for providing certain information as to the height, width, and geometric position of the character. This information is then utilized during the main scan so that during the main scan, information about the character is sensed only along a few predetermined lines. The main scan of a character is performed simultaneously with the pre-scan of the next character to be identified in a single optical system, thereby scanning two characters simultaneously. This is inherently faster than if only one character were scanned at a time. An advantage of using the single optical system is that with very small and closely spaced characters, the use of two distinct optical systems would be impractical.

Accordingly, it is an object of this invention to provide an improved character recognition apparatus.

A more specific object of this invention is to provide scanning means for a character recognition apparatus, which simultaneously scans a first character fo recognition while a second character is pre-scanned for geometric positional variations.

Another object of this invention is to provide means for using the information obtained from the pre-scan for determining the scanning pattern for the main scan.

A still further object of this invention is to provide means for producing a scanning pattern for the main scan without the use of a cathode ray tube.

The foregoing and other objects, features and advantages of the invention will be apparent from the following more particular description of a preferred embodiment of the invention, as illustrated in the accompanying drawings.

GENERAL DESCRIPTION

In accordance with one aspect of this invention, an optical system is provided for simultaneously performing a pre-scan and a main scan. The actual scanning lines produced are a plurality of closely spaced parallel lines, shown in FIG. 1 as lines *h*. A simple scanning pattern of this type can be produced by means of a number of well known devices, such as a rotating slotted disc and a stationary slot diaphragm, for example. The results of the main and pre-scan are sensed by separate photocells.

Figure 1:
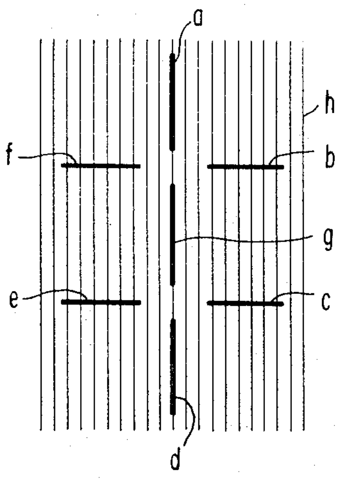
FIG. 1 represents the scanning pattern for the pre-scan (*h*) and the scanning pattern for the main scan (*a–g*).

In accordance with another aspect of this invention, circuitry is provided for utilizing the information provided by the pre-scan for determining the scanning pattern for the main scan. A typical scanning pattern for the main scan is seen in FIG. 1, lines "*a–g*." Optically, the scanning lines "*h*" traverse the character to be recognized in an identical manner both during the pre-scan and main scan. In the main scan, however, the circuitry of this invention blanks out all scanning lines except for a few (lines *a–g* in FIG. 1), which are required for the identification of the character.

A feature of this invention is that a single optical system provides both the pre-scan and the main scan. Another feature of this invention is that the lines for the main scan are produced without the use of a cathode ray tube. During the main scan, the character to be recognized will intersect a certain combination of the programmed scanning lines; the particular combination of lines intersected being an indication of the identity of the character. From what has been stated above, it can now be clearly seen that this invention allows considerable tolerance in the size and shape of a character to be recognized. It is seen how a few well placed scanning lines can accurately define a given character, as long as the position and size of the character are known prior to the main scan. The information for determining the size and position of a charcater is provided by the circuitry in response to the pre-scan.

DETAILED DESCRIPTION

Figure 2:
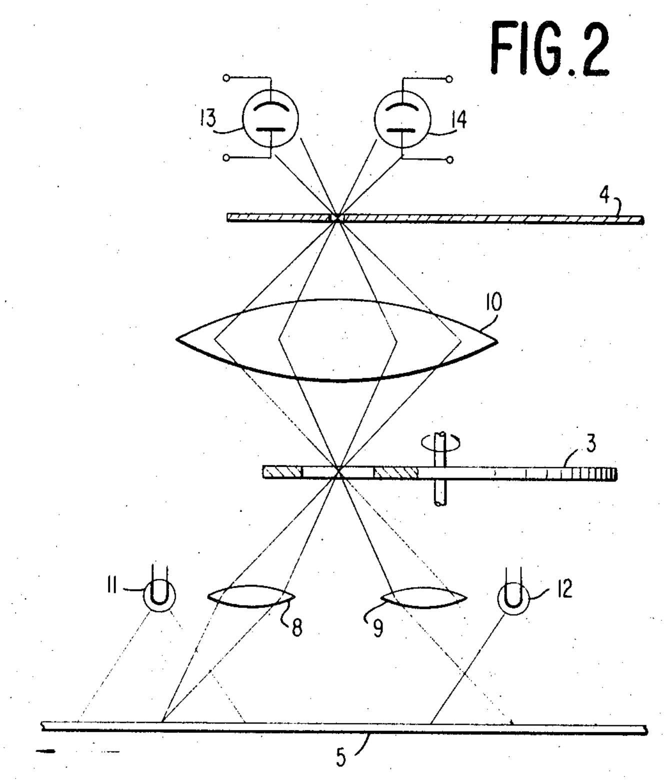
FIG. 2 is a front view of the optical system for performing the pre-scan and the main scan.

Referring generally to FIGS. 1–4, and more specifically to FIG. 2, the optical system for producing the parallel scanning lines "*h*" for both the main scan of one character and for the pre-scan of the next character is shown. The recording medium 5 is illuminated at the areas for the main and pre-scanning stations by light sources 11 and 12, respectively. The regular line pattern as viewed in the plane of the character is produced by rotating disc 3 and an aperture in slot diaphragm 4. Either aperture 4 or recording medium 5 are subjected to a small lateral displacement upon the completion of each scanning line. The character to be pre-scanned appears under light source 12. The light from light source 12 impinges on the character and the light reflected from the character passes through lens 9, the aperture in rotating disc 3, lens 10, the aperture in slot diaphragm 4, and into photocell 14. Circuitry (which is described later herein) is connected to the output of photocell 14. For the main scan, light source 11 causes light to impinge on recording medium 5. The reflected light passes through lens 8, rotating disc 3, lens 10, slotted disc 4, into photocell 13. Circuitry (to be described later herein) is also connected to the outputs of photocell 13. The function of said circuitry is to respond to the outputs of photocell 14 so that only portions of the output of photocell 13 are utilized for recognizing the identity of the character.

Figure 3:
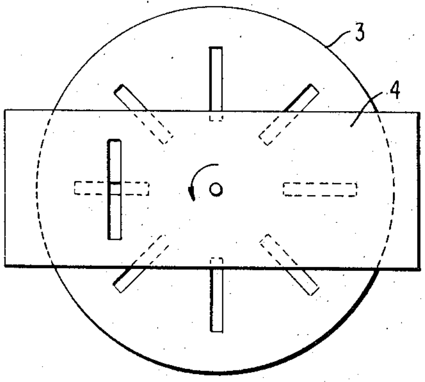
FIG. 3 is a top view of a portion of the optical system, and shows the coaction between the rotating slotted disc and the stationary slot diaphragm.

Referring now to FIG. 3, rotating disc 3 and slot diaphragm 4 are shown. A counter-clockwise direction of rotation is indicated for slotted disc 3. The density of scannine lines "*h*" may be regulated by the number of slots in the slotted disc 3, the rotary speed thereof and by the lateral displacement of the aperture 4 upon the completion of each scanning line. As previously pointed out, the lateral displacement of the recording medium will have the identical effect as lateral displacement of slotted diaphragm 4, and therefore will regulate the spacing of lines *h* in the same way. Any convenient drive means can be used to incrementally move recording medium 5 in a direction shown by the arrow. The number of scanning lines "*h*" required for a character depends upon the boldness of the print. For example, a bold print with thick lines will require fewer scanning lines.

Figure 4:
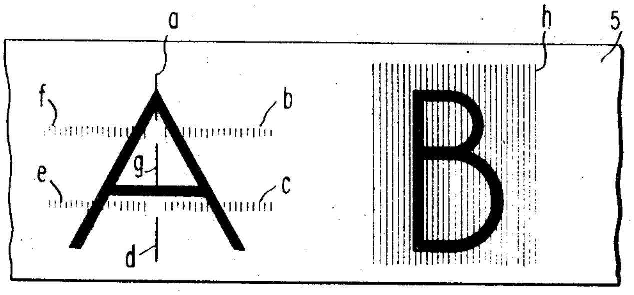
FIG. 4 is a top view of several characters and shows the main scan and pre-scan patterns superimposed over the characters.

Referring now to FIG. 4, a top view of recording medium 5 is shown with the letter "A" in the main scan station, and the letter "B" in the pre-scan station. Scanning lines "*h*" are shown scanning the letter "B." The result of this scan is detected by photocell 14 and is passed to the circuitry connected thereto. Optically, the scanning lines in the main scanning station appear as scanning lines *h* is the pre-scan station. For purposes of illustration, however, the scanning lines "*a–g*" are shown as they appear to the circuitry connected to photocell 13. It is seen that portions of scanning lines "*h*" have been blanked out by the circuitry, in response to the information from the pre-scan. In this manner, only the scanning lines "*a–g*" are used to determine the identity of a character. In FIG. 4, the scanning lines "*b, c, e* and *f*" have been drawn exaggerated in length in order to show the manner in which the corresponding scanning lines represented in FIG. 1 are simulated by the circuitry of this invention.

Figure 5:
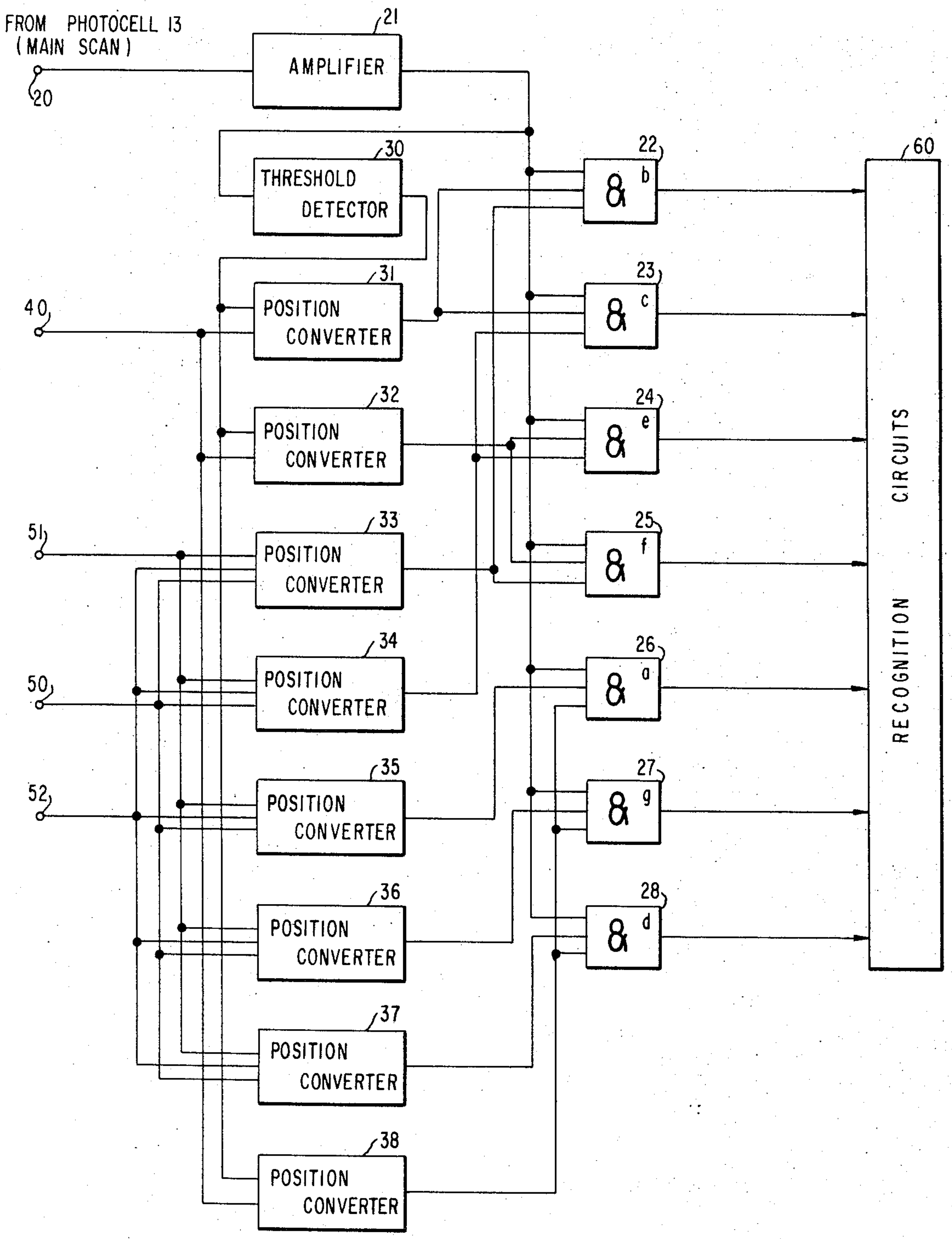
FIG. 5 is a block diagram of the circuit for using the information from the pre-scan for blanking out the scanning lines not needed for the main scan, thereby producing the desired pattern for scanning the character for recognition.

With reference to FIG. 5, a portion of the electronic circuit of this invention will be described. The function of the circuitry in FIG. 5 is to blank out the scanning lines not needed for identifying a character. The signal resulting from the main scan, i.e., from the photocell 13, is applied to terminal 20, amplified and shaped in amplifier circuit 21, and applied to the AND circuits 22–28. The output of amplifier 21 is also applied to circuit 30. Circuit 30 detects when a character first passes into the range of the main scan. If stylized characters with a marked starting edge are to be recognized, circuit 30 consists of an integrator and a threshold-dependent pulse generator (e.g., a Schmitt trigger) for ensuring a minimum length of the starting edge. Circuits 31–38 are position converter circuits and are responsive to information from the pre-scan of a character. It is the function of circuits 31–38 to utilize the information from the pre-scan for producing gating pulses for AND circuits 22–28. Converter means 31–38 may be any of a number of well known implementations of analog voltage to time delay converters with a pulse output at the end of the delay time. An example is disclosed by R. W. Leurgans in U.S. 3,133,210. When used as converter means, 33–37, two summing resistors would be connected to the delay control voltage input of Leurgans. The other terminals of the summing resistors would be connected to terminals 51 and 52. To provide the discrete pulse output which must occur at the end of the time delay, further pulse shaping will be utilized as suggested in Leurgans, column 4, lines 2–5. The gating pulses at the outputs of circuits 31–38 condition AND circuits 22–28 during the times indicated, by the small letters, in each of said AND circuits. For example, AND circuit 22 is conditioned by its input to be responsive to a signal from circuit 21 during time "*b*." (Refer to FIG. 1 which shows typical times during which each of lines "*b–g*" are to be simulated by the circuitry.) AND circuits 22–28 will have an output whenever circuit 21 has an output at times "*a–g*." Recognition logic 60 is responsive to the output of AND circuits 22–28 and accepts and stores signals from said AND circuits as a function of time. These signals are then compared to a plurality of previously stored reference signals, thereby providing the identity of the unknown character.

Figure 6:
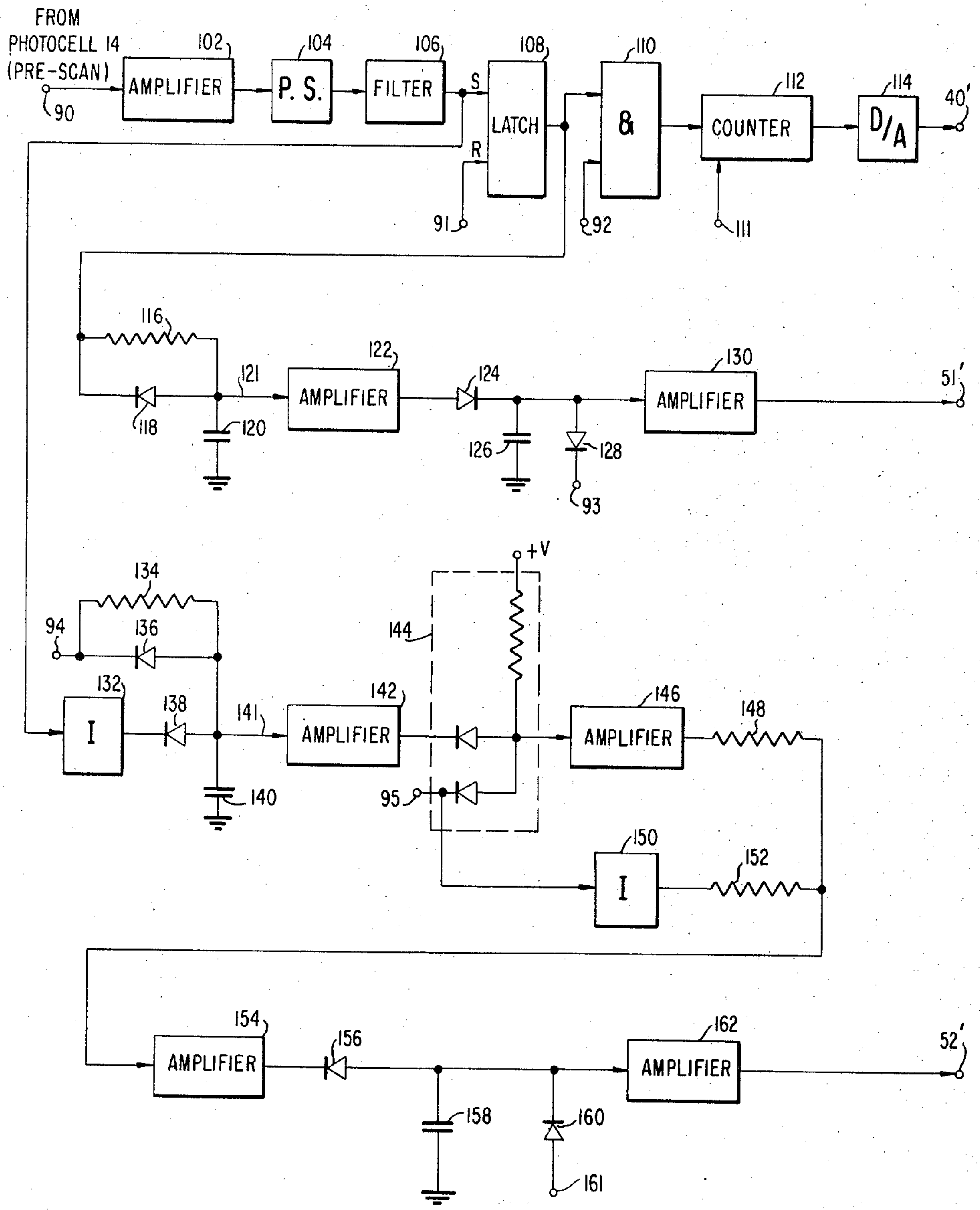
FIG. 6 is a diagram of the circuitry connected between photocell 14 (FIG. 2) and the circuitry of FIG. 5.

FIG. 6 is a circuit diagram showing the circuitry connected to the output of photocell 14 and providing input to the circuit of FIG. 5 at terminals 40, 51, and 52. The circuit of FIG. 6 has as its input, the output of photocell 14 at terminal 90. The output of the circuit of FIG. 6 at the completion of a pre-scan of a character appears at contacts 40′, 51′, and 52′ as steady state voltages which indicate the width, upper edge, and lower edge of the character, respectively. In order that information from the pre-scan and main scan of a character be applied to the circuitry of FIG. 5 simultaneously, a delay line, register, or other analog storage means (not shown), can be connected between outputs 40, 51, and 52 of FIG. 6 and the corresponding inputs to FIG. 5. Since the components used to make up FIG. 6 are all conventional and well known, the circuit of FIG. 6 will be described in greater detail in terms of its operation.

OPERATION

Refer to FIG. 2 for the operation of the optical scanner. Light source 12 illuminates recording medium 5 in the area of the pre-scan. Recording medium 5 has a plurality of characters imprinted thereon. Light reflected from recording medium 5 passes through lens 9 along the optical path indicated in the diagram to photocell 14. The output of photocell 14 is the input to contact 90 in the circuit of FIG. 6. With continued reference to FIG. 2, light source 11 is seen illuminating recording medium 5 in the main scan area. Light reflected from this second scan area passes through lens 8 along the optical lines indicated in the diagram to photocell 13. The output of photocell 13 is the input to the circuit of FIG. 5 at terminal 20.

With reference to FIG. 3 the coaction of rotating slotted disc 3 and slot diaphragm 4 is shown. It is seen that light impinging on rotating slotted disc 3 and then on slot diaphragm 4, is converted into a beam of light moving in a straight line. The particular positioning of rotating slotted disc 3 and slot diaphragm 4 makes it possible to scan in both scanning stations simultaneously. It is possible to move slot diaphragm 4 incrementally at the completion of each scanning line and thereby avoid the need for incrementing recording medium 5 for producing the desired scanning pattern. The incrementing of either slot diaphragm 4 or recording medium 5 is accomplished by conventionally known means.

With reference to FIG. 5 the circuit for blanking unwanted portions of the scan pattern "*h*" and converting said scan pattern to the pattern of lines "*a–g*" will now be described. Input 20 to the circuit is the output from photocell 13 and represents the result of the main scan of a character. Circuit 21 is merely an amplifier in which the signal from photocell 13 is amplified and shaped. The output of circuit 21 represents the black and white variations in the area scanned. In this example, the output of circuit 21 is positive when a black area is sensed and negative when a white area is sensed. Therefore, whenever a black area is sensed a positive input appears at all of AND circuits 22–28. These AND circuits, however, have an output only when the other two inputs are also positive. The other inputs are only positive during times *b, c, e, f, a, g,* and *d*; these times corresponding to the heavy lines in FIG. 1. The occurrence of these times of course varies from character to character as this information is derived from the pre-scan.

Inputs 40, 51, and 52 receive information from the pre-scan of a character. This information is represented by a steady state analog voltage. In this way, the voltage at input 40 represents the width of the character, the voltage at input 51 represents the upper edge of the character, and the voltage at input 52 represents the lower edge of the character. Input 50 is a timing pulse which is positive for the duration of one scanning line "*h*."

Circuits 31–38 are position converters in that they accept at their inputs analog voltages representative of the size and position of a character, as determined by the pre-scan, and provide at their outputs, pulses at discrete times, depending on the value of said analog voltages. By defining one scanning line as one time frame, the outputs of the position converters can be described. It is the function of the position converters to accept one or more analog voltage levels at their inputs and to provide at their outputs a pulse which is positioned in a time frame in accordance with the value of the analog voltage inputs.

The operation of circuit 33 will be described in detail as an example. Circuit 33 accepts an input through terminal 51, this voltage being an indication of the upper edge of the character. Circuit 33 also accepts an input through terminal 52, this voltage being an indication of the lower edge of the character. Summing algebraically in circuit 33 provides a voltage which is an indication of the height of the character. Circuit 33 also contains timing means. The pulse on terminal 50, which is the third input to circuit 33 indicates the start of a timing frame and initiates the operation of the timing means in circuit 33. Within a certain time from the start of the frame, said time being determined by the value of the analog voltage inputs, circuit 33 provides a pulse within the time frame. The time position of this pulse within the frame is determined by the level of the analog voltage inputs and will remain constant for the entire main scan of a character. The pre-scan of every character provides a new set of voltage levels at terminals 40, 51 and 52, causing a corresponding change in the time position of the pulses at the outputs of the position converter circuits. Position converter circuits 31 and 32 have an analog voltage input which is an indication of the width of the character. A pulse from circuit 30 indicates that the character has entered the main scan station and activates the timing means in circuits 31, 32, and 38. The circuits 31 and 32 supply a pulse during the scanning time corresponding to the horizontal dimension of the scanning lines "*b*" and "*c*" (circuit 31) or of the scanning lines "*e*" and "*f*" (circuit 32), depending on the start of the character (circuit 30) and the width of the character (signal from terminal 40). In a manner similar to that of circuits 31 and 32, circuit 38 provides pulses corresponding to the horizontal position and vertical dimension of the scanning line "*a*," "*g*" and "*d*." The coincidence of outputs from two of the position converter circuits at any given AND circuit conditions that AND circuit which will then have an output if a signal from circuit 21 is also present. An output from one of the AND circuits represents the intersection of a character with one of the scanning lines "*a–g*." The output of the AND circuits can then be compared to previously stored signals to determine the identity of the character.

The signals for the width (terminal 40), upper edge (terminal 51) and lower edge (terminal 52) of the respective characters are derived through the photocell 14 during the pre-scanning process and stored in a device not shown herein until the time of the main scanning process. The circuitry for deriving these analog voltages which represent the width, upper edge and lower edge is shown in FIG. 6.

With reference to FIG. 6, the producing of the signals on terminals 40' (width), 51' (upper edge of the character), 50 (beginning of the vertical scanning line), and 52' (lower edge), will now be described. The signal from photocell 14 is amplified in amplifier 102, quantized binarily in pulse shaper 104, and filtered in filter 106 which suppresses disturbances and noise caused by signals which are smaller than one line width of the character. Circuit 108 is an electronic latch with inputs for setting (*s*) and resetting (*r*) the latch. Latch 108 will have an output as soon as a signal appears at the set input and will continue to have an output until the reset pulse is provided. The reset pulse can be provided by any well known means on terminal 91 at the completion of a time frame. Prior to the resetting of latch 108 a strobe pulse is provided on terminal 92 for conditioning AND circuit 110 to determine the state of the latch output. Counter 112 counts the number of pulses provided at the output of AND circuit 110, the total count in counter 112 is an indication of the number of lines "*h*" which intersected a character during the pre-scan. Counter 112 may be reset by a signal on terminal 111 upon the completion of a complete pre-scanning of a character. Circuit 114 is a digital to analog converter and provides an output voltage in accordance with the total count in counter 112. The voltage at terminal 40' is then an indication of the width of the character.

The voltage at terminal 51' is an indication of the upper edge of a character, and is derived in the following manner. With further reference to FIG. 6 it is seen that the output of latch 108 is integrated by means of resistor 116 and capacitor 120. The resultant integrated signal is transferred through amplifier 122, and stored in the "hold" circuit including diode 124 and capacitor 126. When latch 108 is reset at the completion of a frame, capacitor 120 is discharged through diode 118. It is seen that the longer the duration of the output of latch 108 the higher will be the value of the voltage on line 121. The peak value of the voltage derived during the complete pre-scan of a character is stored in capacitor 126, transferred through amplifier 130 and provides the required analog voltage at terminal 51'. Capacitor 126 is discharged through diode 128 upon the completion of the pre-scan of a character.

With further reference to FIG. 6 the derivation of the signal for terminal 52' will be described. The signal on terminal 94 is a pulse equal in duration to the length of one scanning line, and therefore also equal in duration to one time frame. (It is the same pulse that appears on terminal 50, which is described later herein.) The pulse at terminal 94 then produces a sawtooth wave on line 141 by integrating through resistor 134 and capacitor 140. Each time the line of a character is intersected, by a scanning line "*h*," filter 106 will have an output. Every pulse at the output of filter 106 will be inverted in inverting circuit 132 and thereby discharge capacitor 140, returning the saw tooth wave to its initial voltage value. The signals on line 141 are transferred through amplifier 142 which also serves as an impedance converter for decoupling. The voltage on line 141 that is transferred by amplifier 142 at the completion of a frame, is detected by means of a gating pulse on terminal 95 of diode circuit 144. The resultant pulse is transferred through amplifier 146 and resistor 148 to amplifier 154. The gating pulse at terminal 95 is inverted in inverter 150, transferred to a resistor 152 and added algebraically to the pulse transferred through resistor 148. The values of resistors 148 and 152 are such that the signal into amplifier 154, and its corresponding output, are negative. The lowest negative voltage during the pre-scan of a character is maintained in the "hold" circuit including diode 156 and capacitor 158, transferred through amplifier 162 and appears on terminal 52'. At the completion of the complete pre-scan of a character, capacitor 158 is discharged through diode 160. With further reference to FIG. 6, as has been explained above, the pulse at terminal 94 is of a duration equal to one time frame. As was previously explained, the same pulse appears at terminal 50 of FIG. 5. These pulses as well as other pulses can be produced by various means. For example, these pulses can be produced through holes or slots in the rotating slotted disc in combination with a light source and photocell. Many other techniques will suggest themselves to one skilled in the art.

In summary, an apparatus has been disclosed for performing a pre-scan to obtain information concerning the size and position of a character, and then, using the information obtained from said pre-scan, during the main scan of said character for identification. The information from the pre-scan is used for providing a preferred scanning pattern (lines *a–g*), even though optically the same simple pattern (lines *h*) is utilized both for the pre-scan and the main scan. The preferred scanning pattern for the main scan is produced by the circuitry of this invention by blanking out unwanted portions of the parallel line pattern (*h*). As has been explained above, the preferred scanning pattern is less sensitive to variations in the shape and line thickness of the characters to be recognized. Even though each character is scanned twice, no additional time is needed for recognizing a character because of the simultaneous scanning of a character and pre-scanning of the subsequent character in a single optical system.

While the invention has been particularly shown and described with reference to a preferred embodiment thereof, it will be understood by those skilled in the art that various changes in form and detail may be made therein without departing from the spirit and scope of our invention.

What is claimed is:

1. An automatic signal blanking scan converting apparatus for use in character recognition comprising:
- a recording medium having a plurality of characters imprinted thereon;
- scanning means for providing a closely spaced parallel line pattern in at least two areas said areas being in the plane of said recording medium;
- a first light sensitive means responsive to variations in the light and dark portions of a character in a first of said areas;
- means for moving said character into a second of said areas;
- second light sensitive means responsive to variations in the light and dark portions of said character in the second of said areas;
- first electrical circuit means connected to said first light sensitive means for determining the size and position of a character in the first of said areas;
- second electrical circuit means connected to said second light sensitive means and to said first electrical circuit means for providing an output in response to only those portions of the output of said second light sensitive means which occur along a few predetermined scanning lines which have been generated within said second circuit means in response to outputs from said first circuit means, said predetermined scanning lines being geometrically similar in shape for all characters scanned;
- whereby said output from said second light sensitive means is converted from an output corresponding to a closely spaced line scan into an output corresponding to a scan along only a few predetermined scanning lines.

2. An apparatus as in claim 1 comprising a single scanning means for synchronously providing said line pattern in both of the said areas on said recording medium, thereby simultaneously controlling light beams reflected from both of the said areas.

3. An apparatus as in claim 2 wherein the scanning means comprises:

a stationary slot diaphragm, with said slot in the path of both of said light beams;

a rotating slotted disc in the path of both of said light beams;

whereby each of said light beams passes through the straight line slot in said stationary diaphragm during the rotation of said rotating slotted disc, producing the straight line scan pattern.

4. An apparatus as in claim 3 wherein said stationary slot diaphragm includes:

means for incrementally moving said stationary slot diaphragm at the completion of one straight line motion by said light beams.

References Cited

UNITED STATES PATENTS

| | | | |
|---|---|---|---|
| 3,206,725 | 9/1965 | Fitzmaurice | 340—146.3 |
| 3,263,216 | 7/1966 | Andrews | 340—146.3 |
| 3,295,105 | 12/1966 | Gray et al. | 340—146.3 |
| 3,219,974 | 11/1965 | Rabinow | 340—146.3 |
| 3,366,926 | 1/1968 | Silsby et al. | 340—146.3 |

MAYNARD R. WILBUR, Primary Examiner

W. W. COCHRAN, Assistant Examiner